United States Patent [19]
Valko

[11] Patent Number: 5,303,170
[45] Date of Patent: Apr. 12, 1994

[54] SYSTEM AND METHOD FOR PROCESS MODELLING AND PROJECT PLANNING

[75] Inventor: Andrew G. Valko, Poughkeepsie, N.Y.

[73] Assignee: International Business Machines Corporation, Armonk, N.Y.

[21] Appl. No.: 862,905

[22] Filed: Apr. 3, 1992

[51] Int. Cl.$^5$ .............................................. G06G 7/48
[52] U.S. Cl. .................................... 364/578; 364/401
[58] Field of Search ....................... 364/401, 468, 578

[56] References Cited

U.S. PATENT DOCUMENTS

| | | | |
|---|---|---|---|
| 4,885,686 | 12/1989 | Vanderbei | 364/402 |
| 4,926,362 | 5/1990 | Carns et al. | 364/578 |
| 5,016,170 | 5/1991 | Pollalis et al. | 364/401 |
| 5,111,404 | 5/1992 | Kotani | 364/468 |
| 5,128,860 | 7/1992 | Chapman | 364/401 |
| 5,134,560 | 7/1992 | Ferriter et al. | 364/468 |
| 5,173,869 | 12/1992 | Sakamoto et al. | 364/578 |

OTHER PUBLICATIONS

Int. J. Systems Sci., 1990, vol. 21, No. 8, pp. 1529–1539 "MPSP: A Dynamic Model For Project Planning" by S. Lardera.

Asia-Pacific Journal of Operational Research, pp. 167–191, Oct. 1988, "Temporal Analysis, Cost . . . Evolution Structure" by L. Foulds et al.

European Journal of Operational Research 49, Nov. 1989, pp. 92–101, "A Multi-Stage Non-Deterministic . . . Constraints" by L. V. Tavares.

Proceedings of the 1990 Winter Simulation Conference, pp. 80–88, "Simulation Modeling . . . A Tutorial" by S. D. Roberts et al.

Proceedings of the 1990 Winter Simulation Conference, pp. 72–76, "SLAM Tutorial" by J. J. O'Reilly et al.

Proceedings of the 1989 PMI Annual Seminar . . . Language, pp. 13–20, "The SUPR Model: A . . . Language" by Grobler et al, 1989.

IBM Program Product Publication, SH20-0851-2, "General Purpose Simulation System V Users Manual: Program Numbers 5734-XS2(OS) 5736-XS3(DOS)".

Primary Examiner—Jack B. Harvey
Assistant Examiner—Jae H. Choi
Attorney, Agent, or Firm—Bernard M. Goldman

[57] ABSTRACT

Enables the flexible handling of time, iteration and resource type as variables. For example, project/process simulation tool defines an activity; defines alternative resources required to commence the activity; determine availability of the alternative resources; and varies a duration of the activity based on the availability of the alternative resources. According to another aspect, a modelling process is a computer, provided for including: supplying a modeling program having a plurality of predefined stages of execution which collectively define a transfer function of an activity within a network; defining a plurality of user supplied programming statements, each provided with a label indicative of at least one of the stages of execution; and, causing the modeling program, to execute the user supplied programming statements, each immediately followed by a stage of execution indicated by the associated label.

8 Claims, 6 Drawing Sheets

SYSTEM AND METHOD FOR PROCESS MODELLING AND PROJECT PLANNING

BACKGROUND OF THE INVENTION

A. Field of the Invention

The present invention relates to tools for computerized process modelling and project planning.

B. Related Art

Application programs for project planning have conventionally implemented one of several classical analytical network techniques. An example of one such technique is the Critical Path Method (CPM). In project management tools using the Critical Path Method, the evolution of time in each project is defined in advance. In such systems, every activity and every event of each project occurs only once during a single project execution. Thus, in such systems it is not possible to return to repeat an activity that has already been carried out. This inability to repeat an activity is a shortcoming in that there are many instances in actual projects where activities need to be repeated. Further, there are instances where the recurrence of an activity will need to be modified based on feedback from a prior occurrence of a logically subsequent activity. For example, a part manufactured during a first activity may need to be re-manufactured or repaired based on the results of a subsequent inspection.

An improved analytical network technique known as GERT (Graphical Evaluation and Review Technique) is described in an article entitled "Temporal Analysis, Cost Minimization, and the Scheduling of Projects with Stochastic Evolution Structure (L. Foulds and K. Neumann, Asia-Pacific Journal of Operational Research 6 (1989) pp. 167-191). GERT fills many of the shortcomings of CPM in that it includes provisions for handling the recurrence of activities and feedback.

While GERT is an improvement relative to CPM, a number of problem areas remain. For example, typical project planning applications based on CPM or GERT do not have the capability of utilizing only N of M defined predecessors or successors to an activity's start or finish, where N is greater than 1 but less than M. Nor can a case where N equals zero be handled by either. For example, if five successors are defined to an activity's finish, one cannot activate only four of the five if one uses either CPM or GERT.

Another deficiency with both conventional CPM and GERT applications is the inability to handle variations in activity duration based on available types and quantities of resources. Conventional project planning tools provide the capability to specify a minimum number and type of resources required to perform an activity. For example, an activity may require engineers. Engineers may come in two types, veteran and novice. In conventional project planning tools, one may specify some minimum quantity and type of resources that are required to perform the task. Perhaps the task can be performed by either five veteran engineers or five veterans and two novices, or four veterans and four novices.

While the above-described system accounts for the possibility that different types of resources may be satisfactory to perform a task, the decision is binary. In other words, it assumes either a go or a no go condition. It does not take into account that in the real world, other types or combinations of resources may be able to accomplish a task, albeit in a degraded or perhaps upgraded mode. For example, if there are five veteran engineers available to an activity, it may be completed in duration X. If, however, only four veteran engineers are available, then two additional novice engineers may be required to keep the duration at X. Alternatively, however, if only four veterans and one novice are available the duration of the activity may increase to X+1. If only two veterans are available, the duration may increase to X+20.

Thus, what is needed is a flexible project/process modelling tool that takes into account the possibility that an activity's duration may vary from pass to pass based on types of available resources, and that such duration can vary due to other factors such as the point in time within a project or process.

II. SUMMARY OF THE INVENTION

In light of the above there is provided a project/process simulation tool having a number of aspects or features which enable the flexible handling of time, iteration and resource type as variables.

According to a first aspect, there is provided a project/process simulation tool, including: means for defining an activity; means for defining alternative resources required to commence the activity; means for determining availability of the alternative resources; and, means for varying a duration of the activity based on the availability of the alternative resources.

According to another aspect, there is provided a method of modelling a process on a computer, comprising the steps of: supplying a modeling programming having a plurality of predefined stages of execution, the stages of execution collectively defining a transfer function of an activity within a network of computer modeled activities; defining a plurality of user supplied programming statements, each of said programming statements being provided with a label indicative of at least one of the stages of execution; and, causing the modeling program, to execute the user supplied programming statements, each immediately followed by a stage of execution indicated by the associated label.

According to a third aspect there is provided a tool for computer modeling an activity within a network of activities, comprising: first determination means for determining when a first set of M prerequisites to starting the activity are present, said first determination means including means for selecting the set of from a set of N signals from a plurality of connected activities within the network wherein M is less than N but greater than 1; first signalling means, coupled to said first determination means, for signalling successors to starting of the activity when the first set of prerequisites are present; wait means, coupled to said first signalling means, for waiting for a duration of the activity responsive to signalling of the successors starting of the activity; second determination means, coupled to said wait means, for after said waiting, determining when a second set of prerequisites to finishing the activity are present; and, second signalling means, coupled to said second determination means for signalling successors to finishing of the activity when it has been determined that the prerequisites to finishing the activity are present.

III. BRIEF DESCRIPTION OF THE DRAWING

The present invention will be better understood by reference to the drawing, wherein.

Like reference numerals appearing in more than one FIGURE represent like elements.

IV. DETAILED DESCRIPTION OF THE PREFERRED EMBODIMENT

Figure 1:
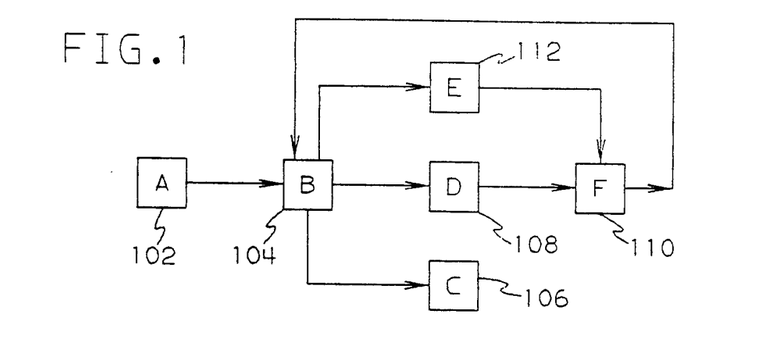
FIG. 1 depicts a network of activities according to an embodiment of the present invention.

An exemplary network of activities is illustrated in FIG. 1. The exemplary network is made up of a plurality of activities 102-112 selectively connected with one another by way of signal lines. A given activity can have a plurality of inputs and a plurality of outputs. According to an embodiment of the present invention, these inputs and outputs can be selected based on programming statements which can take into account factors such as available resources, time and activity iteration. In addition, each activity has a duration which can also be varied based on a programming statement which can take into account the same factors described above.

Figure 2:
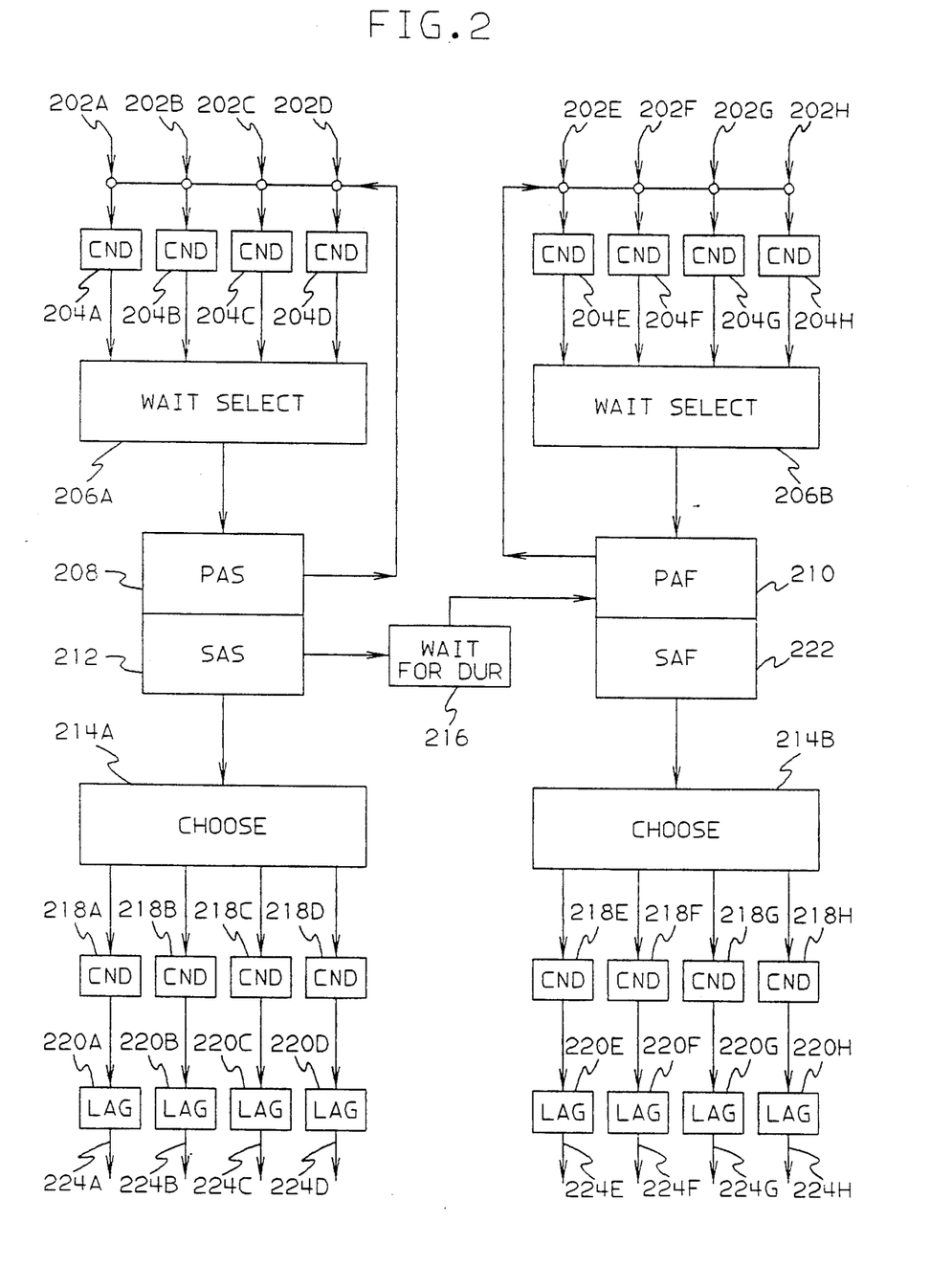
FIG. 2 depicts an exemplary activity according to an embodiment of the present invention.

FIG. 2 is a more detailed diagram of an activity block within the network of FIG. 1. Each of the functional components that define an activity is shown as a separate block.

Each activity may have one or more signal lines 202A-H connecting it to other activities in the network or to itself in a feedback loop. A first set of CONDITION blocks (CND) 204A-H are provided as a means for the user to specify a qualifier that is used to determine which of these signal lines 202A-H is selected as an active input. Each qualifier is a condition or conditions that will evaluate to either "true" or false". Whenever the specified condition is false, the signal qualified by the condition block is "not selected". That is to say that the signal will not be sent to connected blocks (e.g., 206A-B) and further, the connected blocks will not wait for that signal to "turn on" before continuing. If the condition is true, then connected blocks will check the state of the corresponding signal input and, if so programmed, will wait for that signal to "turn on" before continuing.

The conditions specified in the CONDITION blocks 204A-H can be expressed using simulation programming constructs, pure programming constructs, or both, and may be a compound expression, such as (A<5)|(B>12). In this context, a "pure" programming construct uses no entities characteristic of simulation languages, while a simulation programming construct does use such entities, such as a simulation clock, random number functions, facilities and waiting queues.

There are simulation languages, such as PL/I-GPSS (PL/I GPSS), that support both pure programming constructs and simulation programming constructs. In any event, if a condition is not specified, the CONDITION block interprets it as "Always True", thus selecting the attached condition.

A first WAIT SELECT (WS) block 206A is connected to the oututs of CONDITION blocks 204A-D. Similarly, a second WAIT SELECT block 206B is connected to the outputs of CONDITION blocks 204E-H. There may be any number of inputs to the WS blocks, not necessarily the four inputs each depicted here. As previously described, signals which are not selected by the CONDITION blocks are ignored. For each activity's WAIT SELECT block, the user selects whether it is to "wait for any one" or "wait for all" input signals. In the first case, the block waits for only the first input signal to arrive (for which the corresponding condition block evaluates as "true"), at which time it issues an output-signal. In the second case, the WS block waits for all the input signals to arrive (for which the corresponding condition block has evaluated as "true"), at which time it issues an output signal.

If no connected input signals have been selected by the attached CONDITION block (i.e., all conditions have evaluated as "false"), the WAIT SELECT block issues its own output signal without delay. Therefore, "wait for any one" can act as "wait for any one" or "wait for none", while "wait for all" can act as "wait for all", or "wait for none", or "wait for any number in between". Also, if there are zero inputs to this block, then it issues its own output signal without delay.

The output of each WAIT SELECT block is connected to a Prerequisite block. Specifically, the output of the first WAIT SELECT block 206A is connected to the input of a Prerequisites to Activity Start (PAS) block 208, while the output of the second WAIT SELECT Block 206B is connected to a Prerequisites to Activity Finish (PAF) block 210. When the input to the PAS block 208 is turned on, the activity to which it belongs is considered to have started. The input signals to the first WAIT SELECT block 206A are turned off at this time. This operation is done to enable this activity to properly restart later. The Successors from Activity Start (SAS) block 212 is activated in response to and immediately following activation of the PAS block 208.

When activated, the SAS block 212 determines if this activity's start is connected to the start or finish of any other activities, possibly including itself. If one or more such connections exist, then this box issues its own output signal, which is fed to a first Choose-Only-One/-Choose-All (CHOOSE) block 214A. The number of such connections equals the number of output signals from the CHOOSE block 214A. When the CHOOSE block 214A has completed its operations, the SAS block 212 activates the Wait for Duration of Activity (WAIT) block 216. If there are zero such connections, then the SAS block 212 does not send a signal to the CHOOSE block 214A, however, the WAIT block 216 is activated immediately. Each activity has a second CHOOSE block 214B which will be described in more detail later.

The CHOOSE blocks 214A,B may have any number of outputs, not necessarily the four outputs depicted here. Each output is a signal to some activity in the network. Each signal can be coupled to some activity (referred to as a "corresponding activity") on the network which can be some other activity in the network or the same activity. In other words, each output of a CHOOSE block is coupled, via a CND block and a LAG block, to an input of a CONDITION block 202A-H of an activity in the network (i.e., signals 224A-H become input signals 202A-H of a connected activity in the network). For each activity's CHOOSE block which has at least one output, the user selects whether it is to "choose only one" or "choose all". In the first case, the CHOOSE block tests the Condition block 218A-H, attached to each output signal until a true Condition is encountered, at which time this output signal is selected, the others are "ignored" whether or not they have been tested yet, and the WAIT block 216 is activated via the SAS block 212. In the second case, the CHOOSE block tests the Condition block 218A-H attached to each output signal and selects all such signals carrying a true Condition, after which the WAIT block 216 is activated via the SAS block 212.

It should be understood that the results of "choose only one" state are highly dependent on the order in which the signals are tested. For example, each of the input signals can be numbered and tested from the lowest numbered signal to the highest numbered signal. Alternatively, the signals can be tested from highest to lowest or using any other testing algorithm. In systems with a graphical interface, a strategy of assigning numbers based on relative horizontal or vertical positions can be used. For example, signals depicted as horizontal input lines can be tested from top to bottom while signals depicted as vertical input lines can be tested from left to right. In any event, a predictable testing order should be used.

If all output signals carry a false Condition, for both "choose only one" and "choose all", no output signals will be selected, although, after this determination is made, the WAIT block 216 is immediately activated. Therefore, "choose only one" can act as "choose one" or "choose none", while "choose all" can act as "choose all", or "choose none", or "choose any number in between". Also, if there are zero outputs from the CHOOSE block, then the WAIT block 216 is activated without delay.

A second set of condition blocks 218A-H operate in the same manner manner as the first set of condition blocks 204A-H. One of these blocks is attached to each output of the CHOOSE blocks 214A,B. When the condition in a condition block 218A-H evaluates as false, the signal to which it is connected is not selected (i.e., it is not sent to the connected blocks). When the condition in a condition block 218A-B evaluates as true, its connected signal is selected if determined appropriate by the connected CHOOSE block 214A,B.

A LAG block 220A-H is attached to each output from the CONDITION blocks 218A-H. For each Lag block, the user can specify a lag, which is in the form of a single programming phrase and evaluates to some non-negative numerical value. In the present context, a programming phrase is defined as any expression which, when evaluated, is a legal value for a programming variable. The lag is the number of project/process time units to wait before issuing the signal to the corresponding activity, as this term is defined in the description for the CHOOSE blocks 214A,B. A lag of zero means to issue this signal immediately, without waiting. The lag may be expressed using simulation constructs, pure programming constructs, or both.

If the lag is not specified, it is taken as zero. If the lag is zero, the signal to the corresponding activity will be done directly by this activity. Otherwise, this activity will dynamically create a quasi-activity which will wait the amount of the lag, then issue the signal. This is done because if this activity did such waiting and signalling itself, elaborate precautions would be needed to prevent interfering with other operations done by this activity. Any programming statements attached to the connection (programming statements are described in more detail with respect to FIG. 4) are executed by this activity itself before the quasi-activity starts. Even when a lag is zero, this activity itself executes any such programming statements.

The WAIT block 216 is the only block which is not directly related to connections with other activities in the network. The user input to the WAIT block is an activity duration in the form of a single programming phrase which evaluates to some non-negative numerical value. This duration is the number of project/process time units needed to perform this activity. When the WAIT block 216 is started by the SAS block 212, it waits the number of time units determined by the programming phrase before it issues its output signal. A duration of zero means this output signal is issued immediately, without waiting. No default value is assumed for this duration. The duration may be expressed using simulation constructs, pure programming constructs, or both.

The Prerequisites to Activity Finish block (PAF) 210 is connected to receive a first input from the WAIT block 216 and a second input from the second WAIT SELECT block 206B. When both inputs to this box are in the "on" state, the activity to which it belongs is permitted to finish. The input signals to the second wait block 206B are turned off at this time. This operation is done to allow this activity to properly execute again later. In response to the PAF block 210 being activated (by both of its inputs being turned on), the Successors from Activity Finish block (SAF) 222 is activated immediately.

When the SAF block 222 is activated, it determines if this activity's finish is connected to the start or finish of any other activities, including itself. If one or more such connections exist, then the SAF block issues its own output signal, which feeds the second CHOOSE block 214B. The number of such connections equals the number of output signals from the second CHOOSE block 214B. If there are zero such connections, then a signal to the CHOOSE block 214B is not sent, and this activity is considered to have finished. The second CHOOSE block 214B operates internally in the same manner as the first CHOOSE block 214A.

Figure 3:
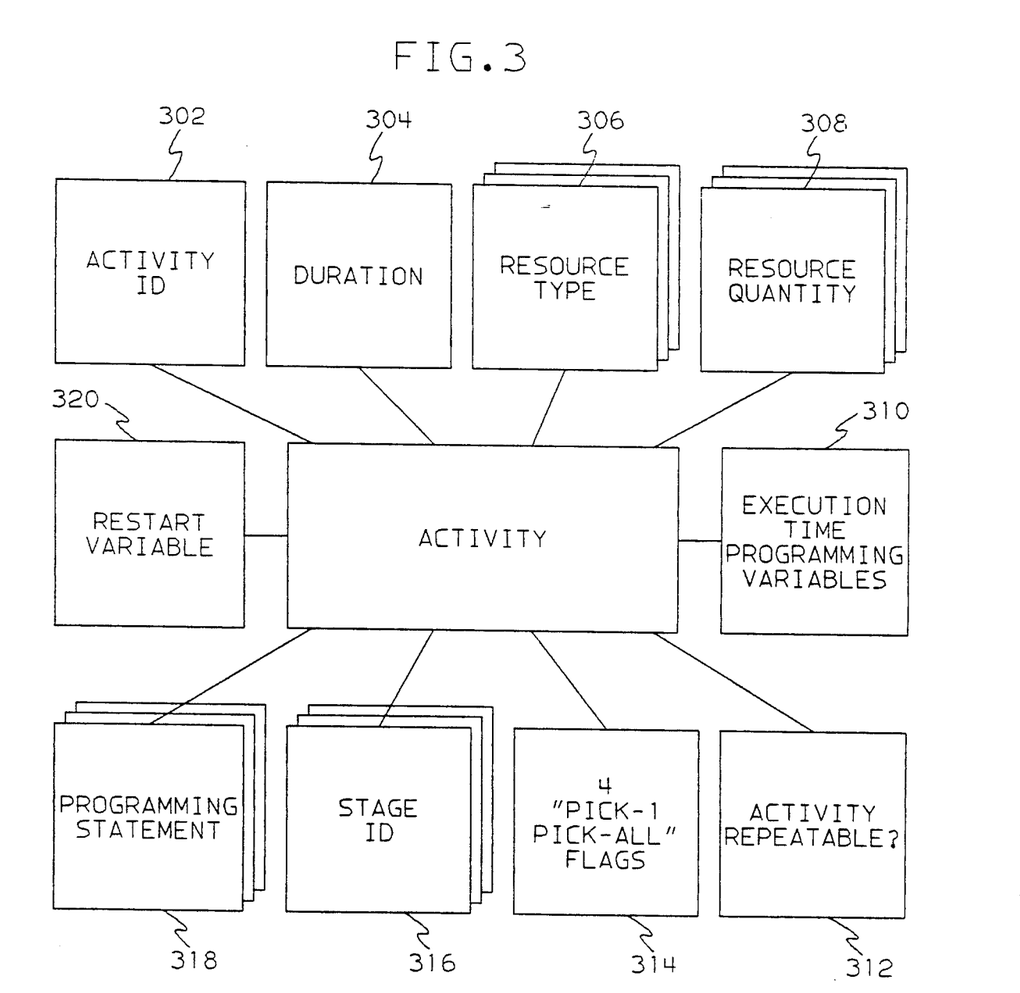
FIG. 3 depicts the user inputs to the internal blocks of the activity of FIG. 2.
Figure 4:
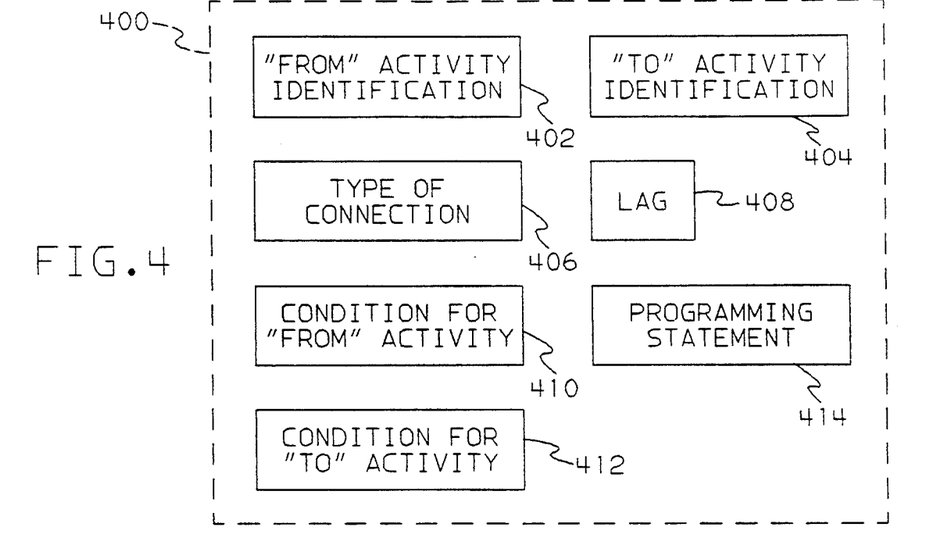
FIG. 4 depicts the user inputs defining the interconnections between the the activities of FIG. 1.
Figure 5:
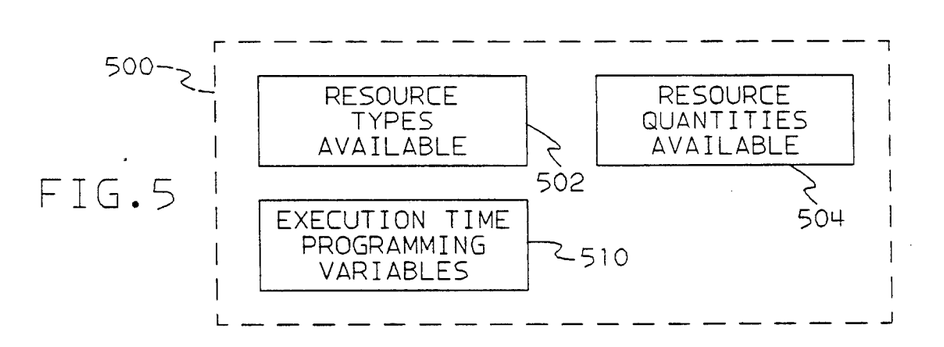
FIG. 5 depicts the user inputs to the network of FIG. 1.

FIGS. 3 through 5 depict the user inputs to the network of FIG. 1. The inputs are divided into several groups. The group of inputs depicted in FIG. 3 are related to each defined activity. Another group of inputs, depicted in FIG. 4, are related to the connections between defined activities. Still another group of inputs, depicted in FIG. 5, are related only to the network as a whole. The network is the set of all activities in the project or process under consideration, plus all items related to these activities and relationships between these activities, especially connections linking one activity to another.

The group of inputs related to each activity is illustrated in FIG. 3. Each of these inputs provides user supplied or default data to a block within an activity. These inputs can be specified in a number of ways. For example, each may be specified by having the user supply the information to the activity by way of a connected input block displayed on a computer display screen (e.g., as illustrated in FIG. 3). Alternatively, the data can be supplied by way of a programming type statement (e.g., DURATION=X+20). In any event, this input data controls the behavior of an activity within the context of the network.

Activity Identification block 302 is an identification, or name, unique to each activity. The data for this block can be supplied by the user or by the simulation program in the absence of a user supplied name.

Duration block 304 is the user input to WAIT block 216 of FIG. 2. The Duration block specifies the duration of the activity (i.e., the amount of time taken starting from when the activity begins and ending when this activity has finished). This may be a single programming phrase. The value of the duration may be affected by the Resource Type block 306, Resource Quantity block 308, and values of execution time programming variables as defined in Execution-Time-Variable block 310. Although this embodiment assumes duration has no default value, another embodiment can be created which assumes a default of zero time if duration is not specified by the user.

The Repeatable Flag 312 indicates whether this activity is repeatable or can be executed only once. If not specified by the user, the default value is non-repeating.

The "Pick One/ Pick All" flags block 314 includes four separate flags as follows:

Flag 1 is an input to the first WAIT SELECT block 206A. This flag controls whether the activity will wait for either all predecessors or only one before starting.

Flag 2 is an input to the first CHOOSE block 214A. This flag controls whether the activity will signal either all successors or only one after the activity has started.

Flag 3 is an input to the second WAIT-SELECT block 206B. This flag controls whether, before finishing the activity, the activity will wait for either all predecessors or only one.

Flag 4 is an input to the second CHOOSE block 214B. This flag controls whether the activity will signal either all successors or only one after the activity is finished.

If values for any of these four flags are not specified by the user, the default value for such missing flags is pick "all".

The Stage Identification (Stage ID) block 316 provides codes, each code identifying a different stage within the execution of the activity. In examples given later, these codes will each be a single letter, starting with the letter A. If not specified by the user, the default value means "no stage". Stage ID may be specified multiple times per activity. Such multiple specifications can arise if multiple stages are needed for an activity.

The Programming Statement block 318 provides a place for a user to specify a programming statement to be executed during the stage specified by the Stage ID block. If not specified by the user, the default value means "no statement". The programming statement may be specified multiple times per activity. Such multiple specifications can arise if multiple stages are needed for an activity and/or multiple statements for one stage of an activity are needed. Each specification of this Programming Statement box requires a corresponding Stage ID.

The Resource Type block 306 defines the types of resources that an activity either needs or may use. If not specified by the user, the default is "no resources used". Examples of resources are engineers, programmers, concrete, and money. The user may specify none, one, or multiple resource types per activity.

The Resource Quantity Block 308 defines the amounts of the resources, specified in the Resource Type block 306 for that activity, that an activity either needs or may use. If not specified by the user, the default is zero. In this embodiment, the values for resource quantities must always be positive or zero. Each resource quantity may be a single programming phrase. For each resource type defined for an activity, the user must specify one resource quantity value.

The Restart Variable 320 is a programming variable which controls whether or not an activity is restarted after it has completed executing at least once. It has an effect only if the activity is restartable, as determined by the Repeatable Flag 312. It is initialized to a value of "Yes" by the simulation model generator, but the user can inspect it and change its value, if desired. Its use is described further within the discussion of FIG. 7.

The activity interconnection inputs are illustrated in FIG. 4. Like the inputs of FIG. 3, the interconnection inputs can be specified by the user graphically (e.g., by drawing a signal line between two activity blocks) or by a program line (e.g., From-Activity A/To-Activity B).

The "From" Activity Identification block 402 specifies the activity identification, defined in block 302, of the "From" activity in the connection between two activities. Similarly, the "To" Activity Identification block 404 specifies the activity identification, defined in block 302, of the "To" activity in the connection between two activities. In any network model there will likely be a number of such blocks associated with each activity and organized into a table for reference by the simulation program. The "Type of Connection" block 406 describes the type of connection between the two activities. Permitted values, identical to standard CPM terminology, are as follows:

>Finish-to-Start Connection, also known as FS

A signal or signals in the set 224E-H of the "FROM" activity is connected to a corresponding ("TO") activity's input 202A-D.

>Start-to-Start Connection, also known as SS

A signal or signals in the set 224A-D of the "FROM" activity is connected to a corresponding ("TO") activity's input 202A-D.

>Finish-to-Finish Connection, also known as FF

A signal or signals in the set 224E-H of the "FROM" activity is connected to a corresponding ("TO") activity's input 202E-H.

>Start-to-Finish Connection, also known as SF

A signal or signals in the set 224A-D of the "FROM" activity is connected to a corresponding ("TO") activity's input 202E-H.

If not specified by the user, the default value is "FS".

The "Lag" block 408 provides a data input to Lag blocks 220 of FIG. 2. The Lag block 408 specifies the lag, or delay, between the time a connection is activated by a "from" activity and the time the "to" activity senses activation of that connection. In this embodiment, the lag values must always be positive or zero. If not specified by the user, the default value is zero.

Condition blocks 410, 412 each specify a condition which evaluates to either "True" or "False". There may be as many Condition blocks 412 as there are input signals 202(A-H). There may be as many condition blocks 410 as defines a Condition Block 218(A-H) of FIG. 2. Only when the condition in block 410 evaluates as "true", is the associated connection selected by the "from" activity. Each Condition block 412 defines a condition block 204(A-H) of FIG. 2. As to block 412, the associated connection is selected by the "to" activity only if this condition is true. The specified condition may be a simple expression, e.g., $A<5$ or a compound expression e.g., $(A<5)|(B>12)$. If not specified by the user, the default value is "always true".

Programming Statement input block 414 specifies a programming statement executed when the associated connection is selected by the "from" activity. There may be multiple programming statements per connection. If not specified by the user, the default value is "no statement".

The inputs applicable to the network as a whole are depicted in FIG. 5.

Resource Types Available block 502, if specified by the user, defines the types of resources that are available to all activities in the network. If not specified by the user, the default is "no resources used". Examples of resources are engineers, programmers, concrete, and money. The user may specify none, one, or multiple resource types here.

Resource Quantities Available Block 504, if specified by the user, defines the available amounts of each resource specified in Resource Types Available block 502. If not specified by the user, the default is zero. In this embodiment, the values for resource quantities must always be positive or zero or unlimited, i.e., infinite quantity available. Each resource quantity may be a single programming phrase, or may assume a value meaning "unlimited", or infinity. For each resource type defined in block 502, the user must specify one resource quantity value. Note that this embodiment uses one set of conventions for defining and using resources (i.e., types and quantities of resources are set when the project/process starts, and do not change during the execution of the project/process). This does not exclude using other resource conventions in the present method.

Execution Time Variable block 510 specifies programming variables which can be used, during the execution of the model of the project or process, to query various aspects of the project or process being modelled, and to control the operation of the model itself.

Figure 6:
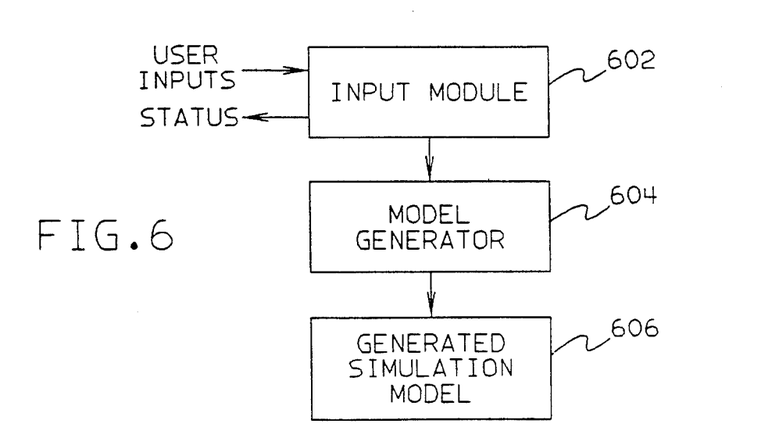
FIG. 6 depicts the means by which a simulation model is generated according to an embodiment of the present invention.

FIG. 6 depicts the means by which a simulation model is generated according to an embodiment of the present invention.

First, Input Module 602 receives inputs from the user, checks all inputs for validity as much as it can, provides feedback to the user on the correctness or incorrectness of the inputs, and sends valid inputs to a Model Generator 604. The user inputs, described with respect to FIG. 3 through 5, define the project or process to be modelled.

Next, using the user inputs validated by the Input Module 602, the Model Generator 604 constructs a Simulation Model 606.

The Simulation Model 606 output by the Model Generator 604 is the simulation model which represents the project or process as specified by the user. It is a computer program, written in a computer simulation language, e.g., GPSS or PL/I-GPSS. This program contains simulation statements, and possibly also programming statements. It is run, (after compilation by the simulation language if not already provided as an object code executable file), as a program executing under run-time control of the simulation language. Numerical results, and other outputs of this model, can only be obtained in this execution phase. Since programming statements can be used, the user may defer specifying some inputs, such as specific values for programming variables used, to the execution phase instead of specifying these via the input module 602.

Figure 7:
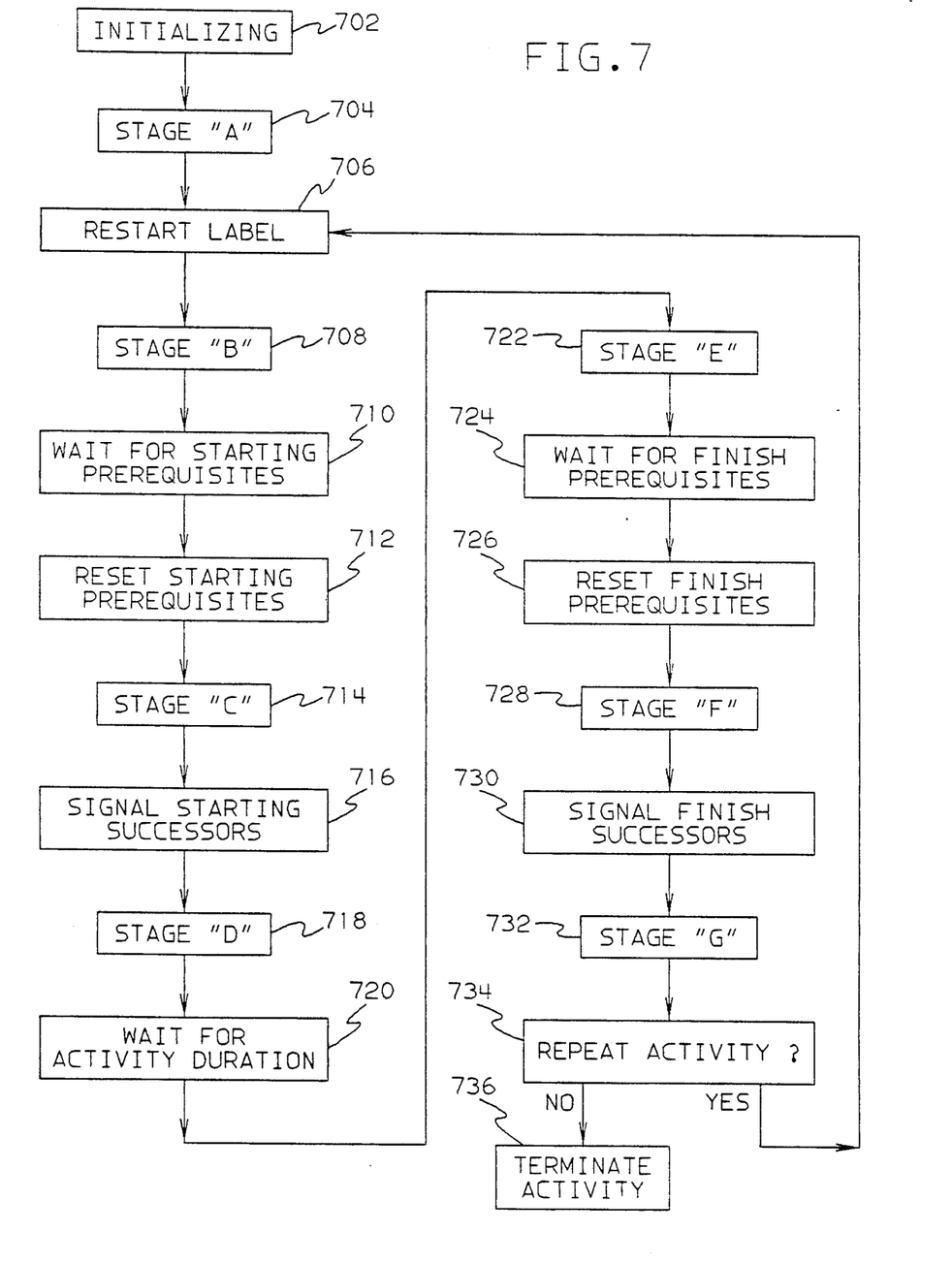
FIG. 7 is a flow chart depicting the operation of the portion of the simulation model representing one activity.

The simulation model is constructed on an activity-by-activity basis. FIG. 7 depicts the operation of the portion of the simulation model representing one activity. The simulation model is constructed so that the representation of each activity follows this same pattern.

In step 702 the model is initialized. The initialization includes execution of statements and definitions, created by the model generator, for initializing processing of this activity (e.g., statements similar to declarations of variables in a typical programming language). The initialization is highly dependent on the particular simulation language being employed. Except for the act of definition, the user has no control of nor input to this step.

In step 704, the model executes a first set of user specified programming statements (Stage A) if any were specified in blocks 316, 318. This enables the user to initialize items, particularly programming variables under his control, similar to the purpose of step 702, plus perform other programming operations, if desired.

Step 706 is an address point defined by a label which the model branches to whenever the corresponding activity is re-started, if this activity is repeatable.

In step 708 the model executes a second set of user specified programming statements (Stage B) if any were specified in blocks 316, 318. This enables the user to perform programming operations immediately after an activity is restarted.

In step 710 the model waits for signals from some number of prerequisites to start this activity, if any such prerequisites exist. The information concerning the number and types of prerequisites required to start this activity are provided in blocks 204A-D, 206A and 208 of FIG. 2.

In step 712 the model resets signals from prerequisites to this activity's start, if any such prerequisites exist. Preferably, only those signals actually "turned on" are reset. If, in a particular embodiment or circumstance, these cannot be specifically ascertained, signals from all prerequisites should be reset. This allows proper synchronization if this activity is repeated later. When step 712 is commenced, the activity is considered to have started.

In step 714 the model executes a third set of user specified programming statements (Stage C) if any were specified. This step, and the steps in this figure containing programming statements for a specific stage, are provided as "slots" in the simulation model in which the user may perform programming operations and thereby "fine tune" the running of the model as the user desires. These steps are particularly valuable when they are in the vicinity of other steps which the user cannot provide input to and/or cannot control.

In step 716, the model determines whether successors from this activity's start exist. If so, then this step issues signals to some number of them, and executes any programming statements, specified in block 414 of FIG. 4, attached to each successor selected, i.e., signalled, here. More information on which successors, and how many of them, are selected is in blocks 212, 214A, 218A-D and 220A-D of FIG. 2.

In step 718 the model executes a fourth set of user specified programming statements (Stage D) if any such Stage D programming statements were specified.

In step 720 the model waits, in terms of project/process time units, for the activity duration to elapse. If one or more resources are required by this activity, then they are obtained immediately prior to commencing the wait for the activity duration. If not all resources are currently available in the required quantities, the activity will not proceed until such conditions are satisfied, and this may entail waiting in terms of project/process time units before the wait for the activity duration commences. When the activity duration has fully elapsed, then all resources used, if any, are released so that they may be available for use by other activities in the project or process.

In step 722 the model executes a fifth set of user specified programming statements (Stage E) if any such Stage E programming statements were specified.

In step 724 the model waits for signals from some number of prerequisites to finish this activity, if any such prerequisites exist. More information on which prerequisites, and how many of them, are needed here to finish this activity is in blocks 204E-H, 206B and 210 of FIG. 2.

In step 726 the model resets signals from prerequisites to this activity's finish (as described with respect to step 712) if any such prerequisites exist.

In step 728, the model executes a sixth set of user specified programming statements (Stage F) if any such Stage F programming statements were specified.

In step 730, if successors from this activity's finish exist, the model issues signals to some number of them and executes any programming statements, specified in block 414, attached to each successor selected (i.e., signalled) here. More information on which successors, and how many of them, are selected is in blocks 222, 214B, 218E-H and 220E-H of FIG. 2.

In step 732, the model executes a seventh set of user specified programming statements (Stage G) if any such Stage G programming statements were specified.

In step 734, the model determines whether to repeat this activity. If the activity is not repeatable, determined by the setting of the repeatable flag 312, this model will take the "No" output branch to step 736 to terminate this activity. If the activity is repeatable, the model will take the "Yes" output branch to step 706 to restart this activity, except for the following special case. If the value of the designated restart variable for this activity, depicted in FIG. 3, block 320, is set to "No" (which can only happen if the user explicitly sets it to this value using a programming statement contained in either block 318 or block 414) then the model will take the "No" output branch to step 736 to terminate this activity.

In step 736, the model executes programming statements, created by the model generator, that terminate processing of this activity, so that it cannot be run again for the remaining time the entire simulation model runs. Except for the fact the user can choose whether to activate this step, the user has no control of, nor input to, this step.

Several noteworthy details about the preceding pattern will now be discussed. The "signals" mentioned can be implemented as simple "on-off" constructs. All such signals must be turned off before the model begins executing. A "From" activity turns on a signal to a successor, or "To", activity when appropriate. The "To" activity waits for such a signal to be turned on before it can proceed, after which it turns it off, or "resets" it.

The "waits" mentioned, both for signals and for the activity Duration, are not complex to implement from the viewpoint of the model constructed. In the first case, the model specifies the signals it must wait for and whether "all" or "one" are needed to proceed, but the simulation language itself, not the model, will check the state of these signals and "wake up" that part of the constructed model when appropriate. Similar logic holds when waiting for the activity duration.

So that the end of the project or process can be correctly determined, any activity that has no connections from its finish is assigned a FS connection from it to an artificial Finish activity, which is specially created to represent the finish of the whole network. This artificial Finish activity waits for all such signals to it to be turned on, at which time it causes the entire model to end. If for some reason these signals are not ever all turned on, another quasi-activity will be invoked to force the whole model to end. This quasi-activity will be activated upon reaching, or shortly before, the maximum value of the simulation clock supported by the simulation language being used.

CLOCK denotes, in later examples, a variable used as the simulation clock. Its value is set and updated by the simulation language, and it is incremented to represent the passage of time, e.g., the duration of an activity. Its units, in this context, are typically project days, though other time units are possible, such as hours or months. In the present embodiment, the start of a project occurs at a time value of 1, though this could just as easily be time 0 instead.

Figure 9:
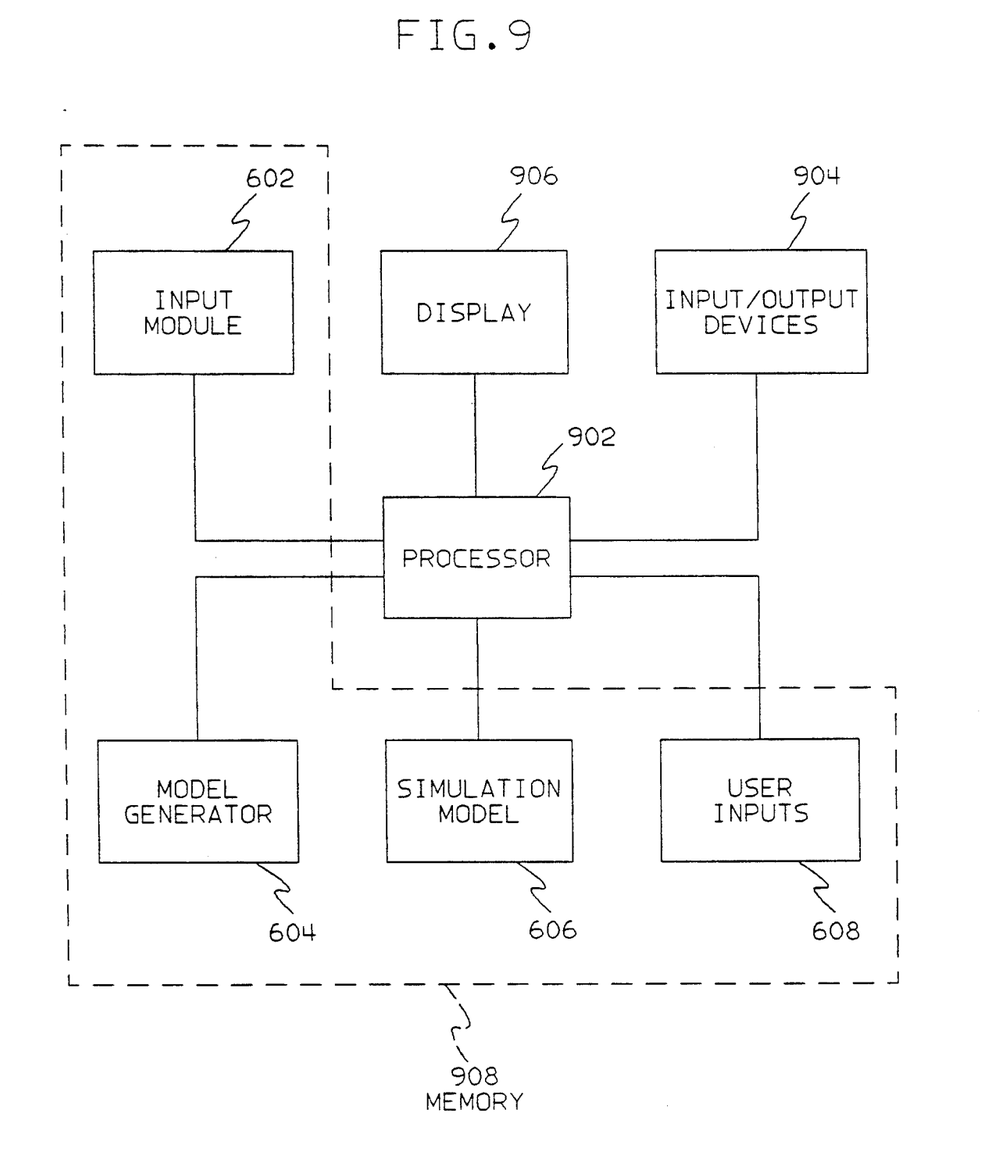
FIG. 9 is an illustration of the elements of FIG. 6 in combination with a conventional computer system.

It should be understood that the simulation model and the simulation model generator can be run on a conventional computer system such as an IBM ES/9000 or IBM 3090. FIG. 9 is an illustration of the elements of FIG. 6 (602-608) in combination with a conventional computer system (processor 902, I/O devices 904, display 906 and memory 908).

Figure 8:
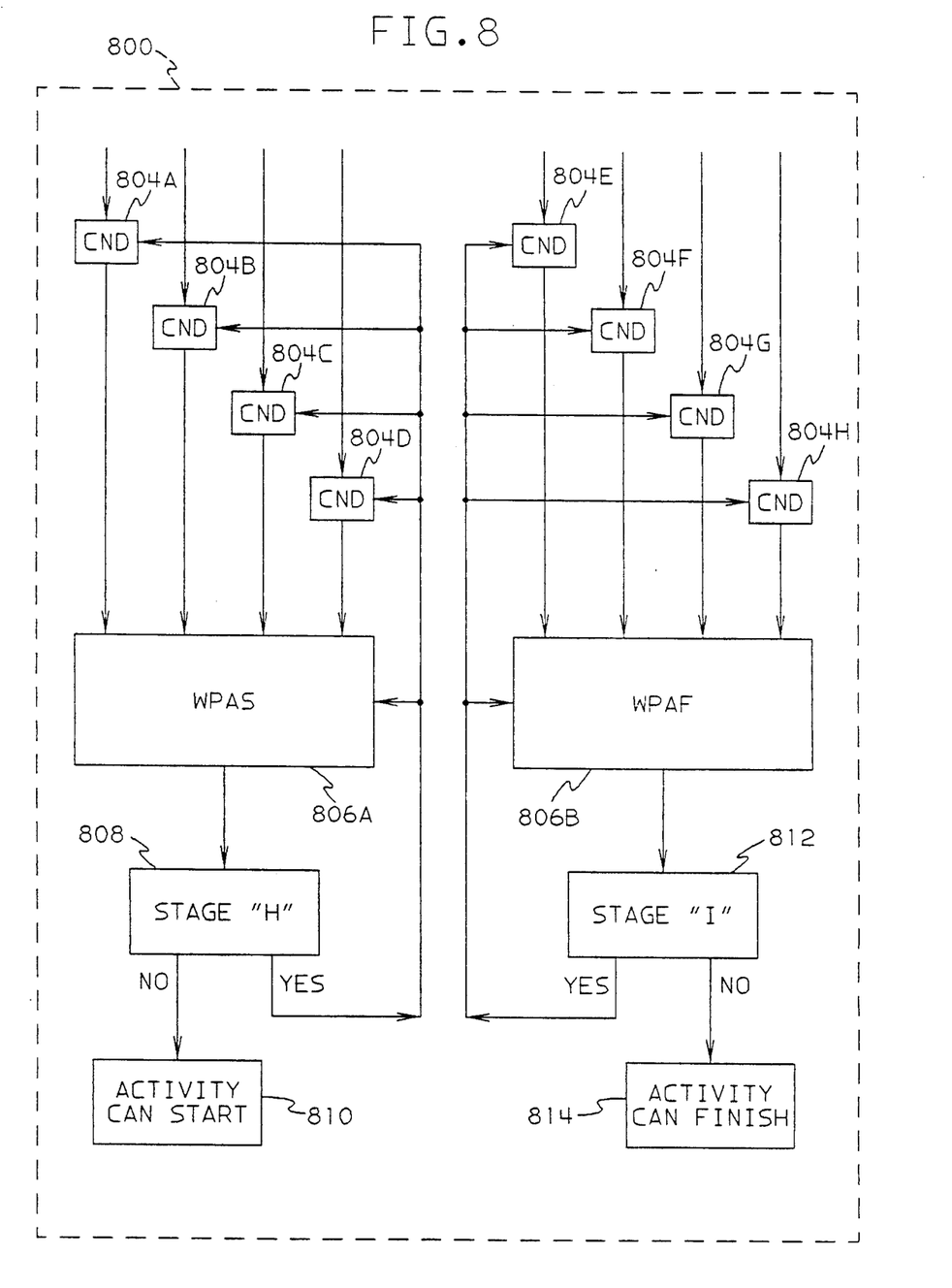
FIG. 8 illustrates a technique for Controlling Start/Finish Prerequisites according to an embodiment of the present invention.

An advanced technique for controlling Start/Finish Prerequisites according to an embodiment of the present invention is illustrated in FIG. 8. The technique of FIG. 8 enables a user, who has enough sophistication, to more precisely control which, and how many, prerequisites to an activity's start or finish are necessary before allowing that activity to start or finish, by permitting the user, multiple times if needed, to dynamically inspect which prerequisites have been satisfied, and dynamically control which prerequisites still need to be satisfied. This capability would have value if, for example, an activity normally needs to satisfy four of five defined prerequisites before it can start, but, if one particular prerequisite of the five defined is satisfied, then only two of the five prerequisites need be satisfied before starting.

Blocks 804A-D are condition blocks (which operate in the same manner as the condition blocks 204A-D of FIG. 2). There is one such condition block attached to each input to the "Wait for Any One Prerequisite to Activity Start (WPAS) block 806A. For each condition block 804A-D, the user is permitted to specify a Condition which will evaluate to either "True" or "False". Whenever the Condition is false, the corresponding input to the WPAS block 806A will not be selected, i.e., the WPAS block 806A will not check the state of that input, and so will not wait for that input to "turn on"

before continuing. If the Condition is true, then the WPAS block 806A will check the state of that input and, if necessary, will wait for that input to "turn on" before continuing.

A second set of condition blocks 804E-H (identical to the first set of condition blocks 804A-D) are attached, one each, to the inputs of a "Wait for Any one Prerequisite to Activity Finish (WPAF) Block 806B. Similarly, for each condition block 804E-H, the user is permitted to specify a Condition which will evaluate to either "True" or "False". Whenever the Condition is false, the corresponding input to the WPAF block 806B will not be selected, i.e., the WPAF block 804B will not check the state of that input, and so will not wait for that input to "turn on" before continuing. If the Condition is true, then the WPAF block 806B will check the state of that input and, if necessary, will wait for that input to "turn on" before continuing.

The condition in each Condition block 804A-H may be expressed using simulation constructs, pure programming constructs, or both, and may be a compound expression, such as $(A<5)|(B>12)$. If the Condition is not specified, it is taken as "Always True".

The WPAS block 806A waits for a signal from any of the prerequisites to start this activity, if any such prerequisites exist. This block is identical to the WAIT blocks 206A of FIG. 2, with "Wait for Any One" selected.

The WPAF block 806B waits for a signal from any of the prerequisites to finish this activity, if any such prerequisites exist. This block is identical to the WAIT block 206B of FIG. 2, with "Wait for Any One" selected.

Stage "H" Programming Block contains a set (Stage H) of programming statements, if the user specified any. This block enables the user to perform programming operations immediately after an activity start prerequisite has been activated. The user is expected to use this box to inspect which activity start prerequisites are currently active and, if the user determines it is necessary in the situation which exists at that time, to change appropriate condition blocks 804A-D. This is because this the Stage H programming block 808 determines whether this activity is to wait for more starting prerequisites.

If the user explicitly issues, as one of the Stage H programming statements in block 808, a programming branch statement to the WPAS block 806A, then the WPAS 806A block will wait for another starting prerequisite. Otherwise, the default is to "fall through" to the Activity Can Start (ACS) block 810 which indicates the state of this activity as being "ready to start". The ACS block 810 is identical to the PAS block 208 of FIG. 2.

When the ACS block 810 is reached, all necessary prerequisites for starting this activity have been met and, therefore, this activity can start. When this occurs, starting prerequisites for this activity are immediately reset, as described with respect to step 712 of FIG. 7.

Stage I programming block 812 contains a set (Stage I) of Programming Statements, if the user specified any. This allows the user to perform programming operations immediately after an activity finish prerequisite has been activated. The user is expected to use this box to inspect which activity finish prerequisites are currently active and, if the user determines it is necessary in the situation which exists at that time, to change appropriate condition blocks 804E-H. This is because the Stage I Programming Block 812 determines whether this activity is to wait for more finishing prerequisites.

If the user explicitly issues, as one of the Stage I programming statements (in block 812) a programming branch statement to the WPAF block 806B, then the WPAF block 806B will wait for another finishing prerequisite. Otherwise, the default is to "fall through" to the Activity Can Finish (ACF) block 814, which indicates the state of this activity as being ready to finish. The ACF block 814 is identical to the PAF block 210 of FIG. 2.

When the ACF block 814 is reached, all necessary prerequisites for finishing this activity have been met and, therefore, this activity can finish. When this occurs, finish prerequisites for this activity are immediately reset, as described with reference to step 726 of FIG. 7. The left side of this figure, i.e., the side with blocks 804AD, 806A, 808 and 810, represents an advanced form of step 710 of FIG. 7, which is labelled "Wait for Starting Prerequisites", while the right side o-f the figure, i.e., the side with blocks 804E-H, 806B, 812 and 814, represents an advanced form of step 724 of FIG. 7, which is labelled "Wait for Finish Prerequisites". This advanced technique of waiting for activity prerequisites illustrates the power of the "stage" concept for inserting programming statements. By defining more stages, as Stages H and I are defined in this instance, the present project/process planning tool can be improved in ways not yet anticipated or foreseen, e.g., expanding the tool and/or making it more flexible, while retaining the ability of the user to "fine tune" the running of the simulation model even in those portions affected by such improvements.

A number of examples demonstrating the use of the present invention will now be demonstrated with reference to the network of FIG. 1. All of these examples illustrate how the operation of the network is changed based on the use of programming variables and the values they contain.

The first example (Example 1) demonstrates the capability to change items in the network based on programming variables and their values. Specifically, one programming switch is set up to allow the duration of an activity to vary based on the value of the switch. Also, the value of another programming variable is used to change which successors from a given activity are chosen.

Turning now to FIG. 1, the project or process begins with activity A 102. When it completes, activity B 104 begins for the first time. On this first iteration, activity B 104 is to select the D-F path (comprising activity D 108 and activity F 110), which will return to activity B 104. On its second iteration, activity B 104 is to select the E-F path (comprising activity E 112 and activity F 110) which again returns to activity B 104. On this iteration, activity B 104 is to select activity C 106, completing the project/process.

One complicating factor in this scenario is that activity F normally has a duration of 1 time unit, but whenever it is executed on the E-F path, its duration changes to 5.

The user supplied input in this example, according to an embodiment of the present invention, is as follows:

| Activity | Duration | Flags | Stage | Statement |
|---|---|---|---|---|
| A | 5 | | | |
| B | 1 | ROOOO | A | DCL BRANCH |

-continued

| Activity | Duration | Flags | Stage | Statement |
|---|---|---|---|---|
| C | 0 | | | INIT(0); |
| D | 0 | R | | |
| E | 4 | R | A | DCL SWITCH EXTERNAL; |
| F | 1 + (4*SWITCH) | ROOOO | A | DCL SWITCH EXTERNAL INIT(0); |

The user-supplied input in the present example regarding connections between activities is illustrated below:

| From | To | Type | Lag | Condition | Statement |
|---|---|---|---|---|---|
| A | B | FS | | | |
| B | C | FS | | BRANCH = 2 | |
| B | D | FS | | BRANCH = 0 | BRANCH = BRANCH + 1; |
| B | E | FS | | BRANCH = 1 | BRANCH = BRANCH + 1; |
| D | F | FS | | | |
| E | F | FS | | | SWITCH = 1; |
| F | B | FS | | | SWITCH = 0; |

An activity flag of "R" indicates a repeatable activity, while "N", or the default of blank, indicates a non-repeatable activity, "O" pick one successor/predecessor, and "A", or the default of blank, pick all successors/predecessors. In this example and all other examples, the activity flags are shown in sample input files in the following order:
Repeatable Flag
Activity Start Predecessors
Activity Finish Successors
Activity Start Successors
Activity Finish Predecessors Two user variables are defined, both in stage A programming statements in the activity input. These variables are called BRANCH and SWITCH. BRANCH, defined in Activity B, is defined and initialized to zero in the attached programming statement. Its function is to determine which successor of activity B to choose, either C, D, or E. If BRANCH=0, the B-D connection is selected, as specified in the Condition column for that connection in the input for connections between activities. In similar fashion, if BRANCH=1, then the B-E connection is selected, while if BRANCH=2, then the B-C connection is selected. The value of BRANCH is increased by 1 whenever selecting either the B-D or B-E connection, as shown in the Statement column for these two connections.

SWITCH, defined in Activity F, is defined and initialized to zero in the attached programming statement, and it is also referenced in the programming statement attached to activity E. The value of SWITCH is zero, unless activity E branches to activity F, in which case the value of SWITCH is changed to one by the programming statement attached to the E-F connection, which is executed by activity E when it branches to activity F. Unlike the other activities, which have constant duration, activity F has a variable duration, which is 1 if SWITCH=0 and 5 if SWITCH=1. This can be seen in the Duration column for activity F. After using the value of SWITCH in its duration, activity F resets the value of SWITCH to zero in the programming statement attached to the F-B connection.

Activities B, D, E, and F are repeatable, while A and C are not, as shown by the presence or absence of the R value in the activity flags. Activities B and F each require only one starting predecessor, as indicated by the O value in the corresponding activity flags. Also, activity B selects only, at most, one finishing successor, as indicated by the 0 value in the corresponding activity flag.

The following describes the chronological order of events for this example network:
Values for BRANCH and SWITCH are initialized to zero;
Activity A executes;
Activity B executes—since BRANCH=0, activity D is selected, with BRANCH being increased to 1;
Activity D executes;
Activity F executes-since SWITCH=0, activity F has a duration of 1, although activity F still sets the value of SWITCH to 0 afterwards;
Activity B executes—since BRANCH=1, activity E is selected, with BRANCH being increased to 2;
Activity E executes—SWITCH is set to 1;
Activity F executes—since SWITCH=1, activity F has a duration of 5, after which activity F resets the value of SWITCH to 0;
Activity B executes—since BRANCH=2, activity C is selected;
Activity C executes.

The use of a variable lag will now be demonstrated by way of a second example (Example 2). Suppose the network discussed in Example 1 still applies, but with the following additional item. The connection from activity F to activity B is now changed so that normally there is a lag of 2 time units between the time F finishes to the time B starts, but whenever activity F is executed on the E-F path, this lag changes to 4. Note that in Example 1, the lag on the F-B connection was always the default of zero time units.

For simplicity, only changes to the user-supplied input versus the previous example will be presented and discussed here. User-supplied input regarding activity data for this example differs from that of Example 1 only for activity F. These differences now follow:

| Activity | Duration | Flags | Stage | Statement |
|---|---|---|---|---|
| F | 1 + (4*SWITCH) | ROOOO | A | DCL SWITCH EXTERNAL INIT(0); |
| F | | | A | DCL LAGVAR; |
| F | | | D | LAGVAR = 2* (SWITCH + 1); |

User-supplied input regarding connections between activities for this example differs from that of Example 1 only for the F-B connection. This difference now follows:

| From | To | Type | Lag | Condition | Statement |
|---|---|---|---|---|---|
| F | B | FS | LAGVAR | | SWITCH = 0; |

The first line for Activity F's input is the same as for Example 1. Two new statements have been added. The first defines a variable LAGVAR, in the same stage SWITCH is defined. The second sets its value to either 2, if SWITCH is 0, or 4, if SWITCH is 1, but this is done during Stage D, which is just before waiting for the duration of the activity, where SWITCH is known to have the proper value, unlike stage A. This value is then used as the amount of the lag when going from F to B, because LAGVAR is specified in the Lag column for the F-B connection.

The use of programming variables to vary an activity's duration based on the current value of a running count of how many times the activity has been executed will now be demonstrated by way of a third example (Example 3). Suppose the network discussed in Example 1 applies, but with the following changes. The duration of activity F now equals the number of times it has been executed. Thus, the first time activity F is executed, its duration is 1, the second time it is executed, its duration is 2, and so on. For simplicity, only changes to the user-supplied input versus Example 1 will be presented and discussed here.

Although the variable SWITCH is not needed in this example, discussion of changes due to this fact will not be presented, so that focus may be maintained on how activity F's duration changes in this example's scenario. With that in mind, user-supplied input regarding activity data for this example differs from that of Example 1 only for activity F. These differences now follow:

| Activity | Duration | Flags | Stage | Statement |
|---|---|---|---|---|
| F | COUNTR | ROOOO | A | DCL COUNTR INIT(0); |
| F | | | D | COUNTR = COUNTR + 1; |

There are no changes in user-supplied input regarding connections between activities for this example versus that of Example 1. The first line for Activity F's input defines a variable COUNTR, initializing it to zero with a stage A programming statement, and also sets the activity duration to the value of COUNTR, as this is specified in the Duration column. The second increases its value by 1, during stage D, which is just before the activity waits for its assigned duration, thus ensuring COUNTR assumes the proper value just before its use.

A fourth example (Example 4) demonstrates how an activity's duration can be varied based on the types of resources, and quantities thereof, available to that activity when it is ready to execute.

Suppose the network discussed in Example 1 applies, but with the following changes. The duration of activity F now depends on the available amount of several resources, as follows If two veteran engineers are available, then the activity can be completed in its minimum duration of 6. If only one veteran engineer is available, then the activity will take longer to complete. However, this problem can be reduced if novice engineers are available. If 4 novice engineers and 1 veteran engineer are available, the duration is 8. If 3 novice engineers and 1 veteran engineer are available, the duration is 10. If 2 novice engineers and 1 veteran engineer are available, the duration is 12. If 1 novice engineer and 1 veteran engineer are available, the duration is 14. If no novice engineers, but 1 veteran engineer, is available, the duration is 16. The activity requires at least 1 veteran engineer at all times. If there are 2 veteran engineers available, novice engineers are not used. No more than 4 novice engineers are used with 1 veteran engineer, because the activity duration will not decrease even if more are available. For simplicity, only changes to the user-supplied input versus Example 1 will be presented and discussed here.

Although the variable SWITCH is not needed in this example, discussion of changes due to this fact will not be presented, so that focus may be maintained on how activity F's duration changes in this example's scenario. With that in mind, user-supplied input regarding activity data for this example differs from that of Example 1 only for activity F. These differences now follow:

| Act | VetEngr | NovEngr | Durn | Flags | Stg | Statement |
|---|---|---|---|---|---|---|
| F | VETENG | NOVENG | DURVAR | ROOOO | A | DCL DURVAR; |
| F | | | | | A | DCL VETENG; |
| F | | | | | A | DCL NOVENG; |
| F | | | | | D | VETENG = MAX(VETA,2); |
| F | | | | | D | VETENG = MIN(VETENG,1); |
| F | | | | | D | NOVENG = MAX(NOVA,4); |
| F | | | | | D | IF VETENG = 2 THEN NOVENG = 0; |
| F | | | | | D | IF VETENG = 2 THEN DURVAR = 6; |
| F | | | | | D | ELSE DURVAR = 8 + (2*(4 − NOVENG)); |

There are no changes in user-supplied input regarding connections between activities for this example versus that of Example 1. Another set of user-supplied inputs is needed in this example to define the amounts of Veteran and Novice Engineers in a pool from which all activities in the process or project needing such resources must take them from. These amounts can be construed in this example as the number available at the start of the project or process. Note however that if there are other activities in this project, besides activities A through F shown here, which use either or both of these resources, then the quantities available to activity F when it is ready to proceed may differ from the numbers shown in the sample input for this data, which follows:

| VetrEngr Pool | NovcEngr Pool |
|---|---|
| 4 | 5 |

Two new columns are defined for the activity input, although only activity F uses them in this example. VETENG is specified for the "VetEngr" column, meaning the number of units of Veteran Engineers activity F needs equals the value of the variable VETENG. NOVENG is specified for the "NovEngr" column, meaning the number of units of Novice Engineers activity F needs equals the value of the variable NOVENG. Also note variable DURVAR is specified for activity F's duration. All these variables are defined in attached stage A programming statements. The remaining statements are all used during stage D, which is just before the activity waits for its assigned duration, and ensure DURVAR, VETENG, and NOVENG assume their proper values just before they are used.

Variables VETA and NOVA represent the available quantities, at the time they are referenced, of resources Veteran Engineers and Novice Engineers, respectively. VETENG is set using VETA, but VETENG is always either 1 or 2. NOVENG is set using NOVA, but NOVENG is always an integer from 0 to 4. If 2 veteran engineers are available, then NOVENG is set to zero, regardless of NOVA, because none are needed in that situation. Finally, DURVAR is set either to 6 if 2 veteran engineers are available, or, if only 1 veteran engineer is available, to the proper number based on the number of available novice engineers.

A fifth example (Example 5) demonstrates how the point in time within the execution of the project or process can be used to vary the execution of the project or process. In this example, an activity's duration will be varied, and also selection of successors from an activity will be varied as well, based on this quantity.

Suppose the network discussed in Example 1 applies, but with the following changes. The duration of activity F now depends on the time within the running of the project or process under study. Specifically, if activity F starts within the first 20 time units, typically project days, of the project/process, then its duration is 4. Otherwise, its duration is 2. Also, activity B will repeatedly select the E-F path, starting with B's second iteration, as long as the project/process is within its first 40 time units, calculated at the point when activity B completes and is ready to select its finish successor. After exceeding this time limit, activity B will select activity C, completing the project/process.

For simplicity, only changes to the user-supplied input versus Example 1 will be presented and discussed here. Although the variable SWITCH is not needed in this example, discussion of changes due to this fact will not be presented, so that focus may be maintained on how activity F's duration changes, and how selection of activity B's finish successor changes, in this example's scenario. With that in mind, user-supplied input to the activity data for this example differs from that of Example 1 only for activity F. These differences now follow:

| Activity | Duration | Flags | Stage | Statement |
|---|---|---|---|---|
| F | DURVAR | ROOOO | A | DCL DURVAR INIT(4); |
| F | | | C | IF CLOCK > 20 THEN DURVAR = 2; |

User-supplied input regarding connections between activities for this example differs from that of Example 1 only for the B-E connection. This difference now follows:

| From | To | Type | Lag | Condition | Statement |
|---|---|---|---|---|---|
| B | E | FS | | BRANCH = 1 | IF CLOCK > 40 THEN BRANCH = BRANCH + 1; |

The first line for Activity F's input changes in two respects. First, its duration is now set to the variable DURVAR. Second, DURVAR is initialized to 4, via a Stage A programming statement. The second line changes DURVAR's value to 2 whenever the variable CLOCK exceeds 20, but this is done during Stage C, which is immediately after the activity is considered to have started. CLOCK is a variable used as the simulation clock. Its value is set and updated by the simulation language, and it is incremented to represent the passage of time in the model, e.g., the duration of an activity.

The only change to the input for the connection from activity B to E is that the programming statement, which alters BRANCH in the manner it did in Example 1, is now executed only if the variable CLOCK exceeds 40.

In this example, the start of the project/process is assumed to occur at a time value of 1. With minor modifications to this example, this can just as easily be time 0 instead.

A sixth example (Example 6) demonstrates how to select activation of a number of successors from an activity, where this number is greater than one, but less than the total number of successors defined. Suppose the network discussed in Example 1 applies, but with the following change. Whenever activity B selects the D-F path, which occurs on Activity B's first iteration, it also selects activity C as well. Thus, on the first iteration of activity B, it selects two finish successors, D and C, but not all of them, as activity E is not chosen.

For simplicity, only changes to the user-supplied input versus Example 1 will be presented and discussed here. Also, for purposes of this example, assume that this network of activities A-F is a subnetwork within a larger network which will not complete until after this subnetwork finishes all of its processing. Although the variable SWITCH is not needed in this example, discussion of changes due to this fact will not be presented, so that focus may be maintained on how selection of activity B's finish successors changes in this example's scenario. With that in mind, user-supplied input regarding activity data for this example differs from that of Example 1 only for activities B and C. These differences now follow:

| Activity | Duration | Flags | Stage | Statement |
|---|---|---|---|---|
| B | 1 | ROAOO | A | DCL BRANCH INIT(0); |
| C | 0 | R | | |

User-supplied input regarding connections between activities for this example differs from that of Example 1 only for the B-C connection. This difference now follows:

| From | To | Type | Lag | Condition | Statement |
|---|---|---|---|---|---|
| B | C | FS | | BRANCH ≠ 1 | |

The line for Activity B's input changes in that one flag, corresponding to selection of finish successors, is changed from O, denoting Select One, to A, denoting Select All. This allows activity B to pick more than one finish successor at a time. The line for Activity C's input changes in that the first flag now indicates that this activity is repeatable, unlike Example 1. This is needed because activity C will be executed at least twice, on activity B's first iteration, and later, on activity B's final iteration.

The only change to the input for the connection from activity B to C is in the condition, so that now, activity C will be chosen if the value of BRANCH does not equal 1. This means activity C is selected if BRANCH equals either 0, which happens on activity B's first iteration, or 2, which happens on activity B's last iteration.

This example assumes that the model will inspect the B-C connection before the B-D connection. If the opposite occurs, a potential problem arises, because the programming statement on the B-D connection increments the value of BRANCH, which will change its value from 0 to 1 on activity B's first iteration, and if 1 is the value of BRANCH when testing the B-C connection, the B-C connection will not be chosen, even on the first iteration of activity B.

In the above-described examples, the user inputs are described and provided by way of a textual simulation language. It should be understood, however, that these inputs could alternatively be provided by way of a graphical interface.

Advantageously, according to an embodiment of the present invention, multiple copies of the same project/process network can be run simultaneously, with the copies interacting with each other. This enables analysis of a super-network combining all these copies, which begins when the first copy network starts and ends on completion of the last copy network to finish. This enables analyzing situations where there are resource conflicts caused by multiple copies of the SAME activity, as opposed to resource conflicts between different activites.

Note that such conflicts can occur when all copies of the network utilize resources from a single, common resource pool.

Now that the invention has been described by reference to the preferred embodiments, various modifications and enhancements which to not depart from the scope and spirit of the invention will become apparent to those of skill in the art. Thus, it should be understood that the foregoing description has been provided by way of example and not as a limitation. The scope of the invention is defined by the appended Claims.

Having thus described my invention, what I claim as new and desire to secure by Letters Patent is:

1. A method for modelling on a computer a network of activities, each activity being performed over a fixed or variable period of time within the method, each current activity comprising the steps of:
   selecting among N number of activities in the network as next activity or activities to be performed in the network as a successor activity or activities of the current activity,
   inputting for the current activity a plurality of conditions for starting or finishing M of N successor activity or activities in the network in which the N successor activity or activities are in relation to the current activity, and
   specifying each condition for starting or finishing a successor activity as a connection of the current activity to the successor activity.

2. A computer modelling method as defined in claim 1, further comprising the step of:
   detecting each condition, and any condition(s) being a function of time.

3. A computer modelling method as defined in claim 1, further comprising the step of:
   detecting each condition, and any condition(s) not being a function of time.

4. The modelling method of claim 1, wherein the inputting step further comprises specifying a variable lag value between a the current end of the successor activities in the network.

5. A method for modelling on a computer network of activities, each activity being performed over a fixed or variable period of time within the method, each current activity comprising the steps of:
   selecting signal(s) from M out of N from predecessor activity or activities in the network as an input to the current activity,
   scanning the state of the M signal(s) to determine when the signals are in a predetermined state, and
   controlling a start or finish of the current activity by detecting when the state(s) of the M signal(s) are in the predetermined state(s).

6. A computer modelling method as defined in claim 5, further comprising the step of:
   detecting the signals as a function of process time to select which signal(s) are being used to control the start of finish of the current activity.

7. A method for modelling on a computer a network of activities, each activity being performed over a fixed or variable period of time within the method, each current activity comprising the steps of:
   first determining when a first set of M of N signal(s) from predecessor activity or activities to start the current activity are present in signal or activites from predecessor activity(s),
   after the first determining step, signalling successor activity or activities in relation to the start of the current activity,
   after the signalling step, waiting for a duration of the current activity,
   after the waiting step, second determining when a second set of signals from predecessor activity or activities to finish the current activity are present in signal(s) from predecessor activity or activities, and
   after the second determining step, signalling successor activity or activities in relation to the finish of the current activity.

8. The modelling method of claim 1, further comprising:
   inputting a plurality of user supplied programming statements before or after any step in claim 7, each of said programming statements being provided with a label indicative of at least one of a plurality of execution inputs in the process modeling tool; and,
   causing the process modelling tool to execute the user supplied programming statements, each immediately followed by an execution block indicated by the associated label.

* * * * *